United States Patent [19]

Nakanishi

[11] Patent Number: 5,454,697
[45] Date of Patent: Oct. 3, 1995

[54] ELECTRICALLY OPERATED PUMP ASSEMBLY WITH AN EXTERNALLY INSTALLED CONTROL CIRCUIT

[75] Inventor: Shingo Nakanishi, Obu, Japan

[73] Assignee: Aisan Kogyo Kabushiki Kaisha, Obu, Japan

[21] Appl. No.: 215,598

[22] Filed: Mar. 22, 1994

[30] Foreign Application Priority Data

Mar. 24, 1993 [JP] Japan ................... 5-090801

[51] Int. Cl.⁶ ........................................ F04B 17/03
[52] U.S. Cl. ................... 417/423.3; 417/423.8; 417/423.14; 310/68 R; 123/509
[58] Field of Search ............... 417/423.3, 423.7, 417/423.8, 423.14, 366, 369; 310/68 R, 64; 123/497, 509

[56] References Cited

U.S. PATENT DOCUMENTS

| | | | |
|---|---|---|---|
| 5,050,567 | 9/1991 | Suzuki | 123/497 |
| 5,080,077 | 1/1992 | Sawert et al. | 123/509 |
| 5,092,748 | 3/1992 | Simmons | 417/423.1 |
| 5,202,596 | 4/1993 | Jensen et al. | 310/68 R |

FOREIGN PATENT DOCUMENTS

| | | |
|---|---|---|
| 56-88982 | 7/1981 | Japan . |
| 2-99288 | 8/1990 | Japan . |
| 4-48143 | 11/1992 | Japan . |

Primary Examiner—Richard A. Bertsch
Assistant Examiner—William J. Wicker
Attorney, Agent, or Firm—Dennison, Meserole, Pollack & Scheiner

[57] ABSTRACT

An in-tank type electrically operated fuel pump assembly includes an electric motor which is controlled by a control circuit located externally of a pump housing and adjacent to a passage through which fuel is fed from the pump. A case in which the control circuit is enclosed is not subjected to a high pressure, assuring stable protection of the control circuit for a long period of time. Furthermore, the control circuit is effectively cooled by the flowing fuel.

5 Claims, 10 Drawing Sheets

ELECTRICALLY OPERATED PUMP ASSEMBLY WITH AN EXTERNALLY INSTALLED CONTROL CIRCUIT

BACKGROUND OF THE INVENTION

1. Field of the Invention

The present invention relates to an electrically operated pump assembly comprising a pump, an electric motor for driving the pump and a control circuit for controlling the rotating speed or the like of the electric motor, and more particularly, relates to such an electrically operated pump assembly disposed in a vehicular fuel tank and adapted to feed fuel in the tank to an engine.

2. Description of the Prior Art

It has been often desired to increase or decrease the discharge quantity from an electrically operated pump. For example, when such a pump is used to feed fuel to a vehicular engine, it is desired to provide a larger discharge quantity when the engine requires more fuel, while it is desired to provide a smaller discharge quantity when the engine requires less fuel. In order to meet such a requirement, the prior art has proposed a technique of using a control circuit for increasing or decreasing the rotating speed of an electric motor. It is also known in the prior art to use a brushless motor for driving the pump, and in this case, a control circuit for switching the exciting phase of the brushless motor is required.

The prior art has also proposed a technique of enclosing the control circuit in a housing in which a pump section and an electric motor section are integrally disposed, and such a technique is disclosed in Japanese Utility Model Publication No. 4-48143 (Japanese Laid-Open Utility Model Publication No. 62-172272), Japanese Laid-Open Utility Model Publication No. 2-99288 and Japanese Laid-Open Patent Publication No. 56-88982. According to the technique disclosed in the above-mentioned Japanese Utility Model Publication No. 4-48143 and Japanese Laid-Open Utility Model Publication No. 2-99288, the control circuit is enclosed in an air-tight container which is installed in the housing, so that fuel pressurized by the pump section flows around the air-tight container. The control circuit includes a power transistor or the like which produces heat during operation thereof. Flow of fuel around the air-tight container can effectively cool the control circuit. Japanese Laid-Open Patent Publication No. 56-88982 discloses a technique of completely separating the control circuit from fuel by means of an insulating material, having no means provided for cooling the control circuit.

Such an arrangement as to enclose the control circuit in the air-tight container around which fuel flows is effective to cool the control circuit. As the liquid in the housing is, however, highly pressurized by the pump section, the air-tight container must be constructed strong enough to stably protect the control circuit from the high pressure liquid for a long period of time. In practice, however, sealed portions of the air-tight container are apt to be broken by the high pressure liquid, which will cause intrusion of the liquid into the air-tight container, resulting in possible damage to the control circuit or inoperativity thereof.

In case the control circuit is completely separated from the high pressure liquid by means of the insulating material, heat transfer from the control circuit to the liquid is prevented, disadvantageously causing possible accumulation of heat in the control circuit.

SUMMARY OF THE INVENTION

It is a primary object of the present invention to provide a structure in which a control circuit for an electric motor is effectively cooled and, at the same time, it can be stably protected from a liquid for a long period of time.

It is another object of the present invention to provide a structure which permits ready installation of an electrically operated pump and the control circuit in a tank.

According to the present invention, there is provided an electrically operated pump assembly comprising a pump section, an electric motor section for driving the pump section and a control circuit for controlling the electric motor section, the pump section and the electric motor section being disposed in a common housing. The control circuit is not disposed in the housing but is fixedly located adjacent to a passage through which liquid pressurized by the pump section flows. With this arrangement, no high pressure of the liquid acts on the control circuit, permitting stable protection of the control circuit from the liquid for a long period of time. Heat produced in the control circuit is effectively transferred to the flowing liquid, assuring effective cooling of the control circuit. Further, the control circuit is assembled as a unit with the electrically operated pump and the liquid passage to be installed in the tank, being readily attached in the tank.

It is preferable to locate particularly parts of electronic components of the control circuit which produce more heat directly adjacent to the liquid passage.

Further, the electrically operated pump, the liquid passage and the control circuit are preferably installed in the tank by securing the pump, the liquid passage and the control circuit to a flange which is then attached to the tank.

The present invention will be more fully understood from the following detailed description and appended claims when taken with the accompanied drawings.

DETAILED DESCRIPTION OF THE PREFERRED EMBODIMENTS (First Embodiment)

Now, a first embodiment of the present invention will be described with reference to FIGS. 1 to 5, in which is shown a in-tank type electrically operated fuel pump assembly for use in a vehicular fuel tank.

Figure 1:
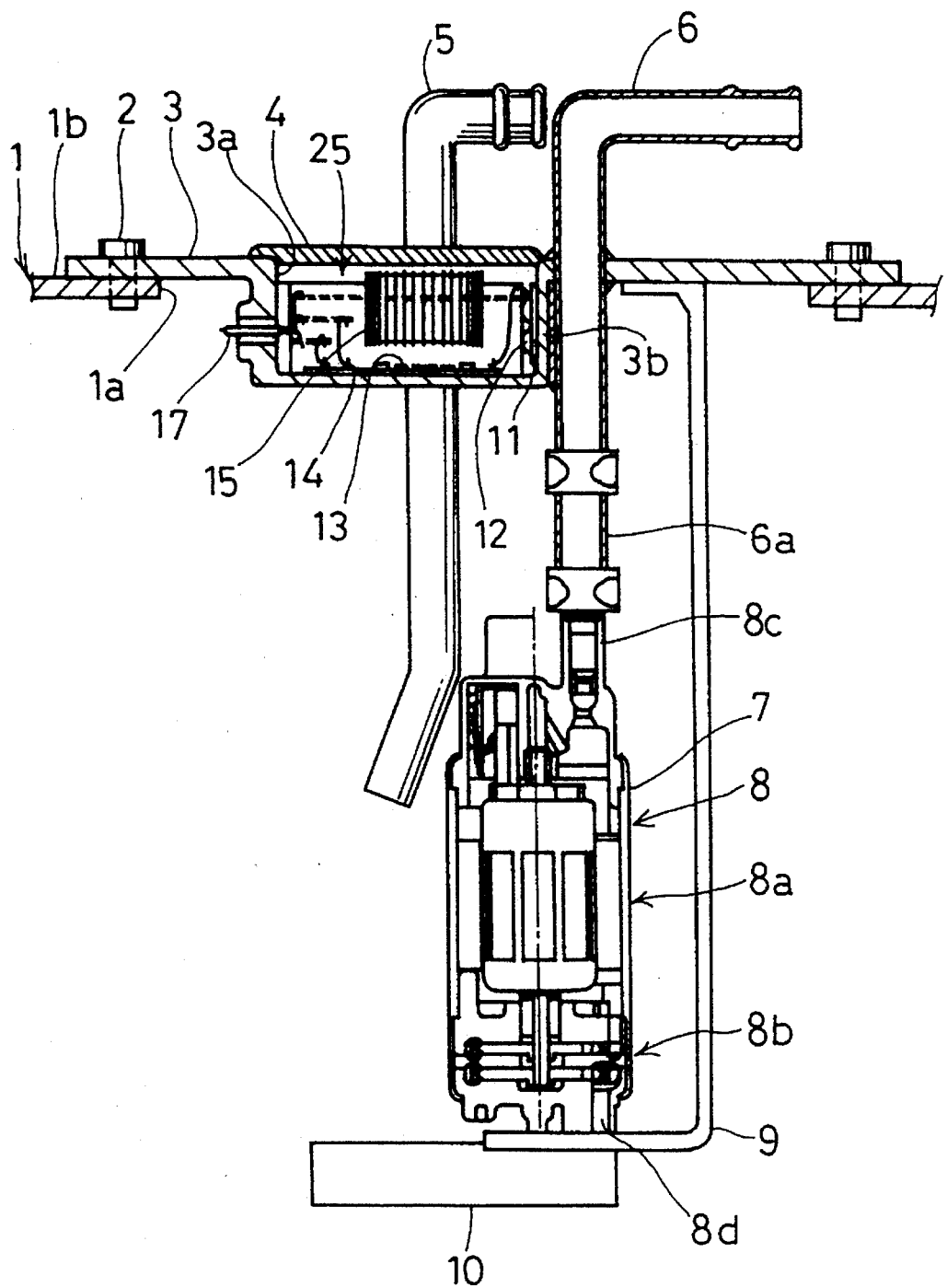
FIG. 1 is a schematic view illustrating an arrangement of an electrically operated pump, a fuel pipe and a control circuit according to a first embodiment of the invention.

In FIG. 1, a fuel tank 1 includes an upper wall 1b having an opening 1a. The opening 1a is closed by a flange 3 secured to the upper wall 1b by bolts 2. A fuel delivery pipe 6 for leading fuel out of the tank 1 and a return pipe 5 for returning fuel not consumed in an engine into the tank 1 extend through the flange 3. A stay 9 is fixed to the lower surface of the flange 3, and an electrically operated fuel pump 8 is secured to the stay 9. The electrically operated fuel pump 8 includes a pump section 8b and an electric motor section 8a for driving the pump section 8b which are both enclosed in a common housing 7, so that the pump section 8b sucks fuel in the fuel tank 1 through a suction port 8d into the housing 7. The fuel introduced into the housing 7 flows through a space in the electric motor section 8a to be discharged from a discharge port 8c. A hose 6a connects the discharge port 8c to the fuel delivery pipe 6. A filter 10 is attached to the suction port 8d.

The flange 3 has substantially at the central portion thereof a depression 3a in which a control circuit 25 for the electric motor section 8a is received. The depression 3a is closed by a cover 4.

Figure 4:
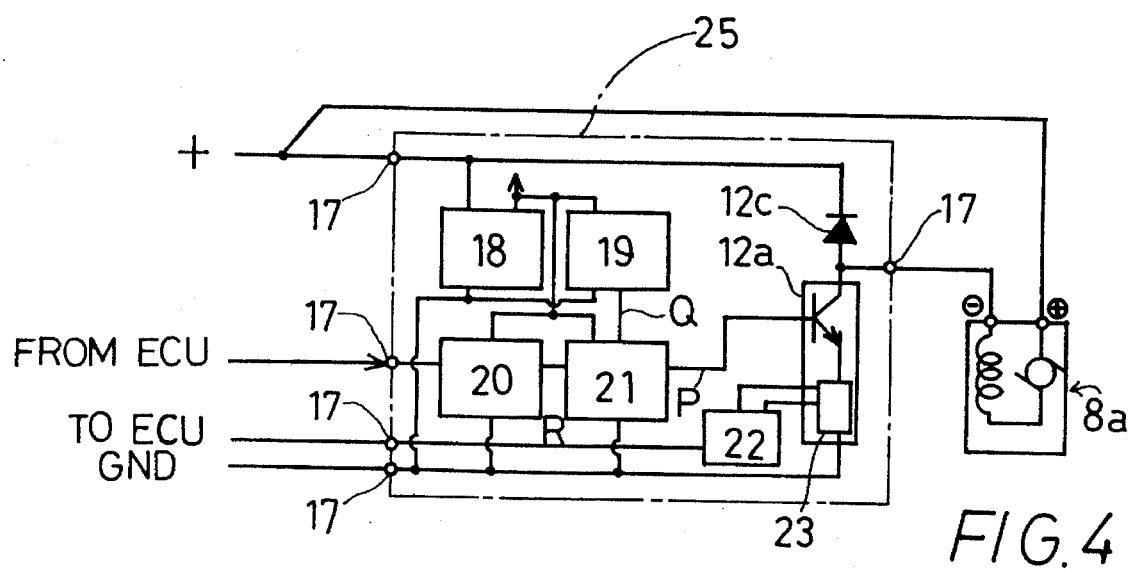
FIG. 4 is a schematic diagram of the control circuit.
Figure 5:
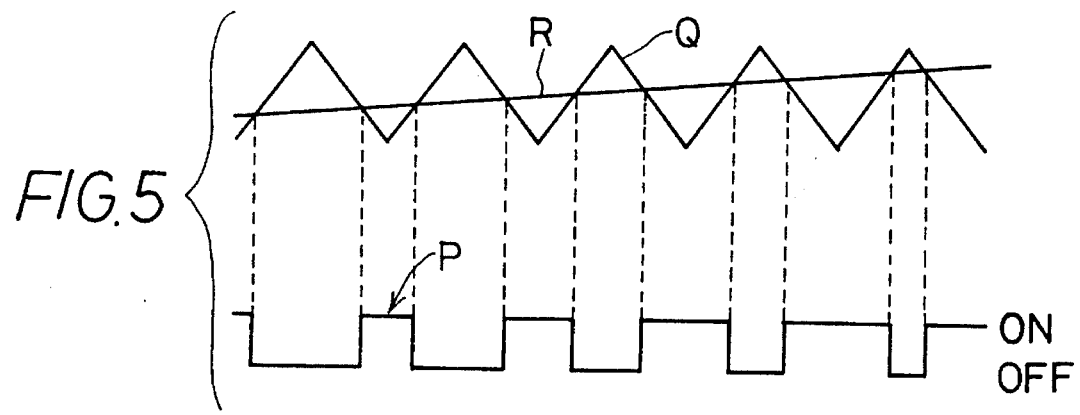
FIG. 5 illustrates the operation of the control circuit of FIG. 4.

The control circuit 25 includes an electric circuit, as shown in FIG. 4, having a fixed voltage supply 18 with a noise filter and a triangular wave generator 19 which generates a triangular wave (See Q in FIG. 5). The circuit further includes a duty/V converter 20 for converting signals generated from an ECU (engine control unit) to indicate the fuel amount required by the engine into a voltage R. The duty/V converter 20 generates a higher voltage R, as the fuel amount required is increased.

A comparator 21 compares the triangular wave Q with the voltage R obtained by the duty/V converter 20, and as shown in FIG. 5, when R is above Q, it produces an ON output, and when R is below Q, it produces an OFF output. While the comparator 21 produces the ON output, a power transistor 12a supplies power to the electric motor 8a. While the comparator 21 produces the OFF output, the power transistor 12a stops power supply to the electric motor 8a. The ON/OFF cycle is repeated at short intervals.

The electric motor 8a is duty-ratio controlled by the control circuit 25, so that, when the engine requires more fuel, the ON period becomes longer to rotate the motor 8a at a higher speed. On the contrary, when the engine requires less fuel, the OFF period becomes longer to rotate the motor 8a at a lower speed.

The control circuit 25 is received in the depression 3a of the flange 3, and particularly power elements including the power transistor 12a, a diode 12c for protecting the transistor 12a and others are mounted on a substrate 11 which is fixed to a vertical wall 3b of the depression 3a. The vertical wall 3b is located adjacent to the fuel delivery pipe 6.

Figure 2:
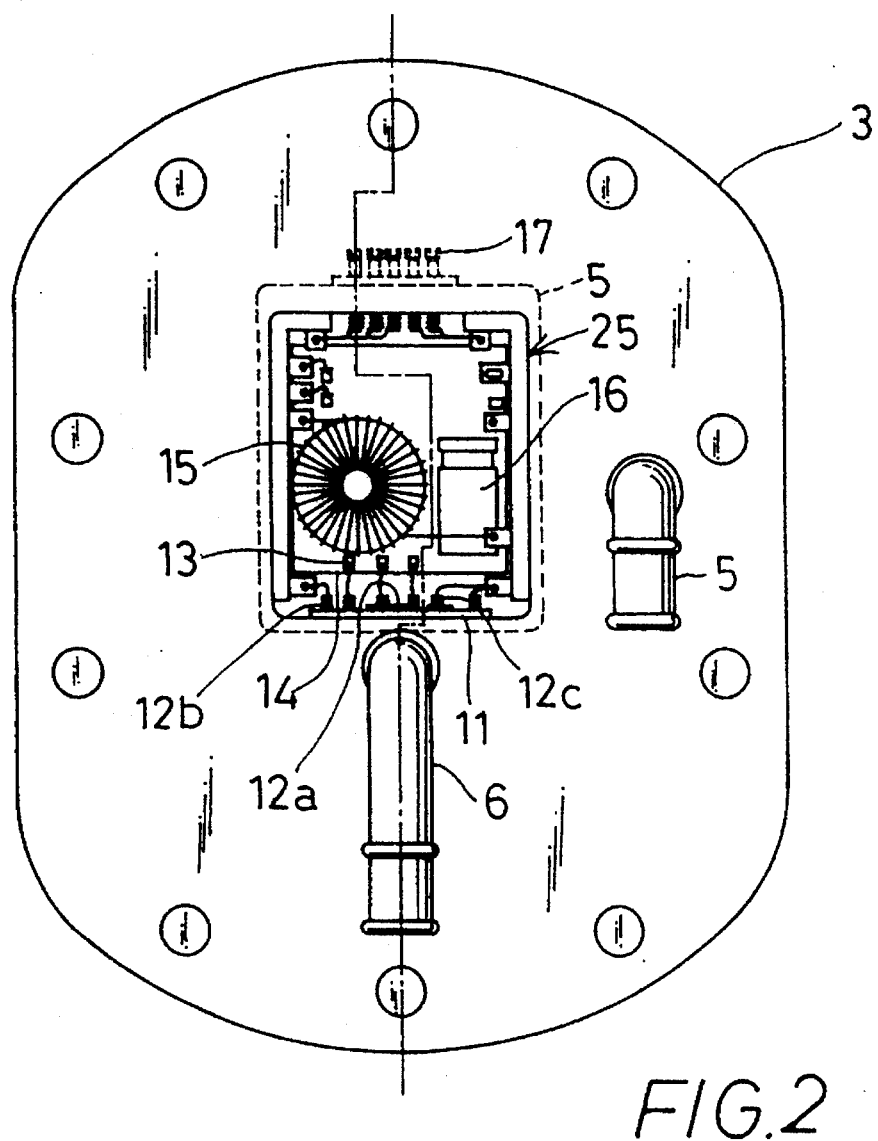
FIG. 2 is a plan view mainly illustrating the control circuit.
Figure 3:
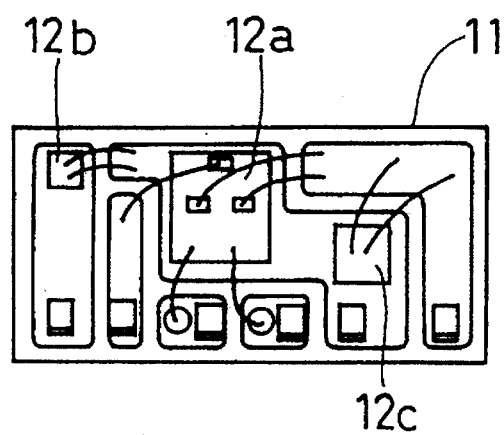
FIG. 3 is a detailed front view of a power substrate in FIG. 2.

As shown in FIGS. 1 and 2, the control circuit 25 further includes another substrate 14 on which elements 13 other than the power elements, a coil 15 and a capacitor 16 are mounted. The coil 15 and capacitor 16 constitute the noise filter. Terminals 17 are provided on a side wall of the depression 3a and are connected as shown in FIG. 4.

In this embodiment, the electrically operated pump the fuel pipes 5 and 6, the control circuit 25 and the cover 4 are preliminarily mounted on the flange 3, which is then attached to the tank 1, thus installed in the tank 1 as shown in FIG. 1.

In this embodiment, the control circuit 25 is not disposed in the housing 7, and therefore, it is not subjected to the high pressure of the fuel. This permits relatively easy sealing provided at the cover 4 and the terminals 17. Furthermore, as the power transistor 12a and other elements of the control circuit 25 which will produce more heat are located adjacent to the fuel delivery pipe 6 through which fuel forcibly flows, the heat produced therein is quickly transferred to the fuel, assuring effective cooling of the control circuit 25.

(Second Embodiment)

The assembly according to a second embodiment is characterized in that the electric motor is a brushless motor, that an exciting phase switching circuit 46 for the brushless motor is received in a housing 57, and that the rotating speed control circuit 25 is provided externally of the housing 57 and adjacent to a fuel pipe 38. Similar or equivalent parts are designated with the same numbers as corresponding parts in the first embodiment, and any further description as to them will be omitted.

Figure 6:
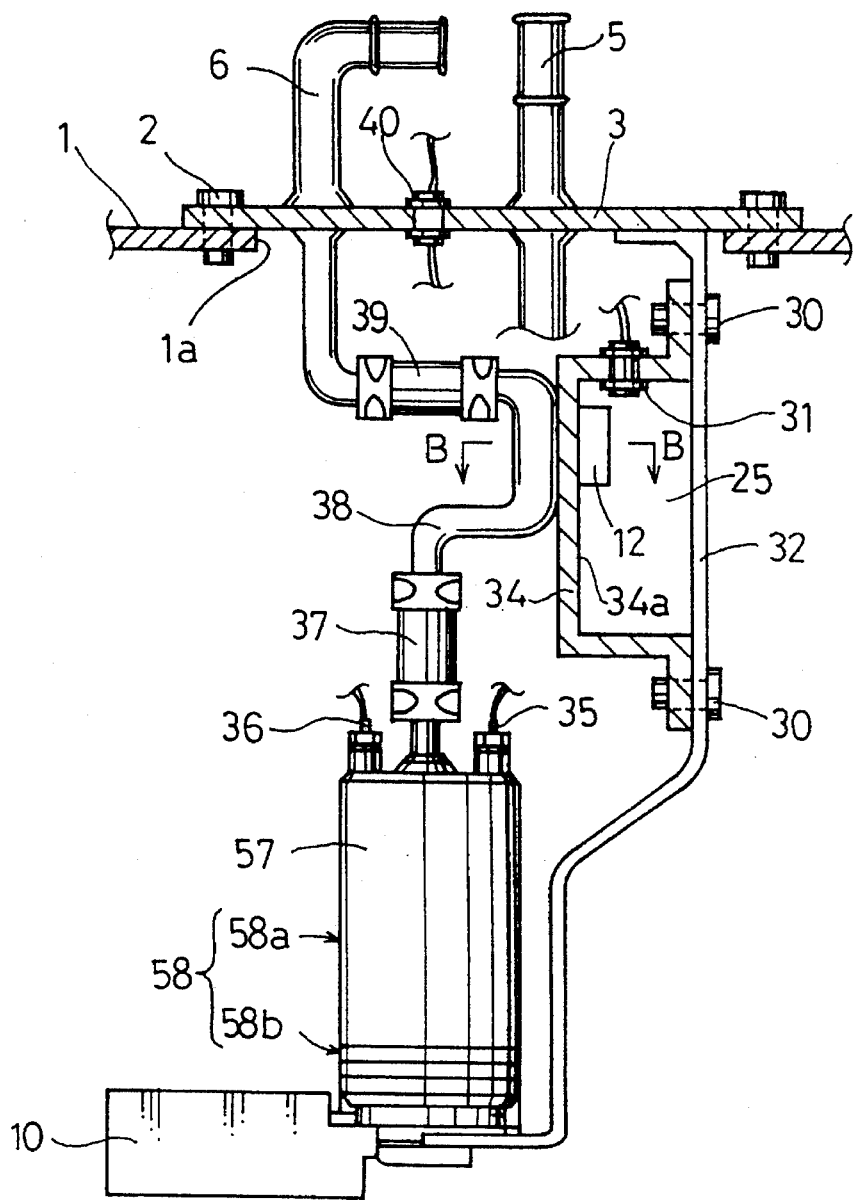
FIG. 6 is a schematic view illustrating the arrangement of the electrically operated pump, the fuel pipe and the control circuit according to a second embodiment.

As is clearly shown in FIG. 6, the rotating speed control circuit 25 is disposed between a case 34 and a stay 32. The case 34 is fixed to the stay 32 by bolts 30.

Figure 7:
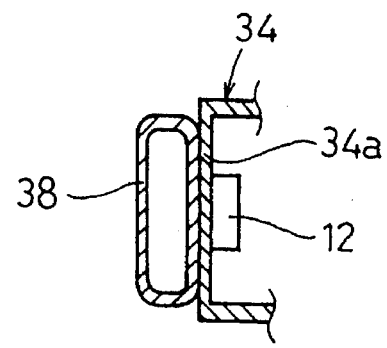
FIG. 7 is a sectional view taken along line B—B in FIG. 6.

The power elements 12 as described in the first embodiment are attached to a left wall 34a as seen in FIG. 6. The wall 34a is in contact with a fuel discharge pipe 38. For this purpose, the fuel discharge pipe 38 is bent in a substantially U-shaped configuration and is connected through hoses 37 and 39. As shown in FIG. 7, the fuel discharge pipe 38 is flattened at a portion in contact with the wall 34a so as to increase the contact surface area therebetween. Leads penetrate the flange 3 through a sleeve 40 having a fuel seal, and leads also penetrate the case 34 through a sleeve 31 having a fuel seal. The connection of the leads is shown in FIG. 12.

Figure 8:
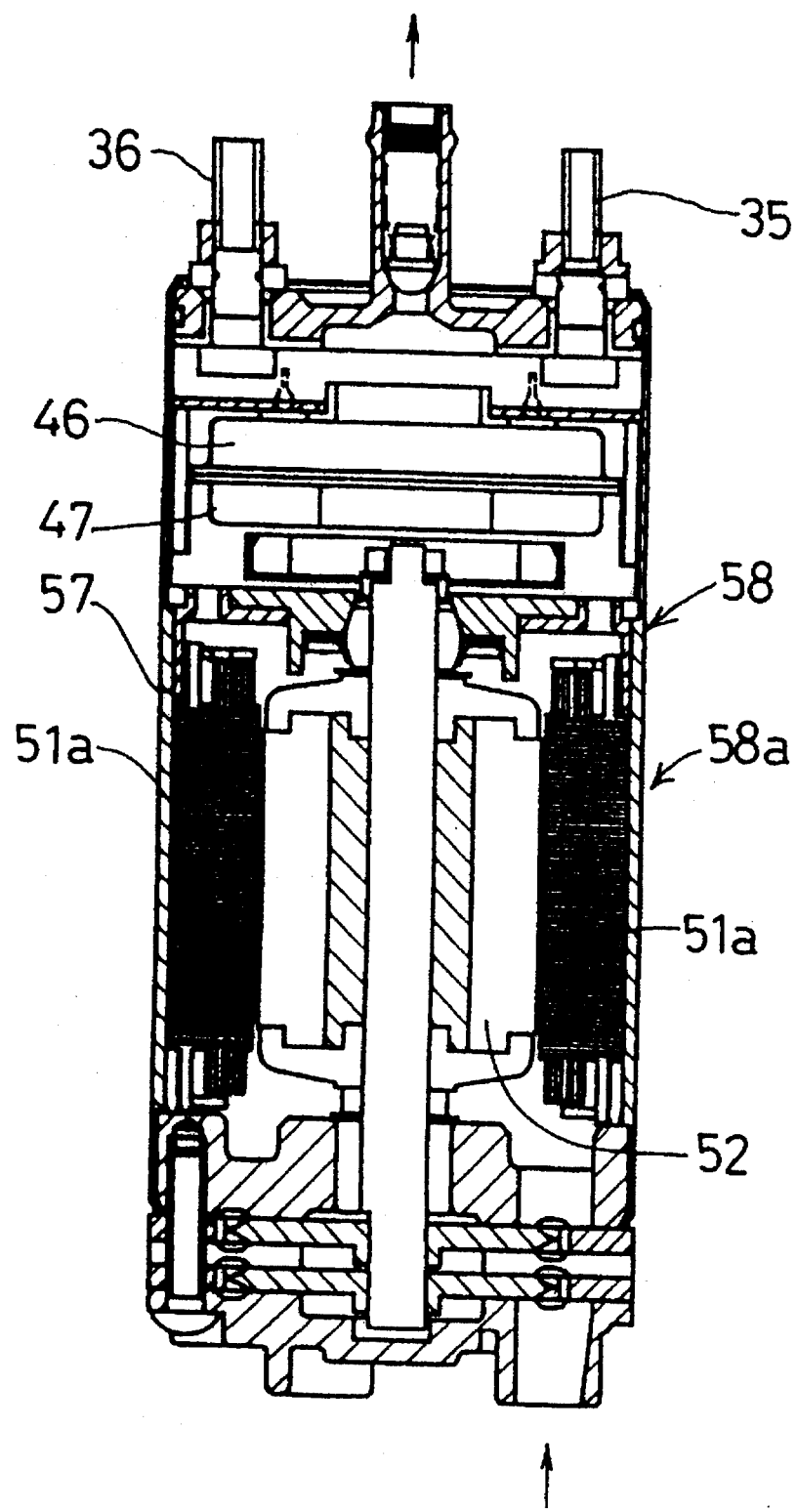
FIG. 8 is a fragmentary sectional view of the electrically operated pump of the second embodiment.

FIG. 8 shows the details of an electrically operated pump 58 of the second embodiment in which a motor section 58a comprises a brushless motor. Three-phase exciting coils 51a, 51b and 51c are wound around a rotor 52 of a permanent magnet (See also FIG. 13). A liquid-tight container 47 is provided to enclose therein a circuit 46 for switching the exciting phase in association with the angle of the rotor 52.

Figure 12:
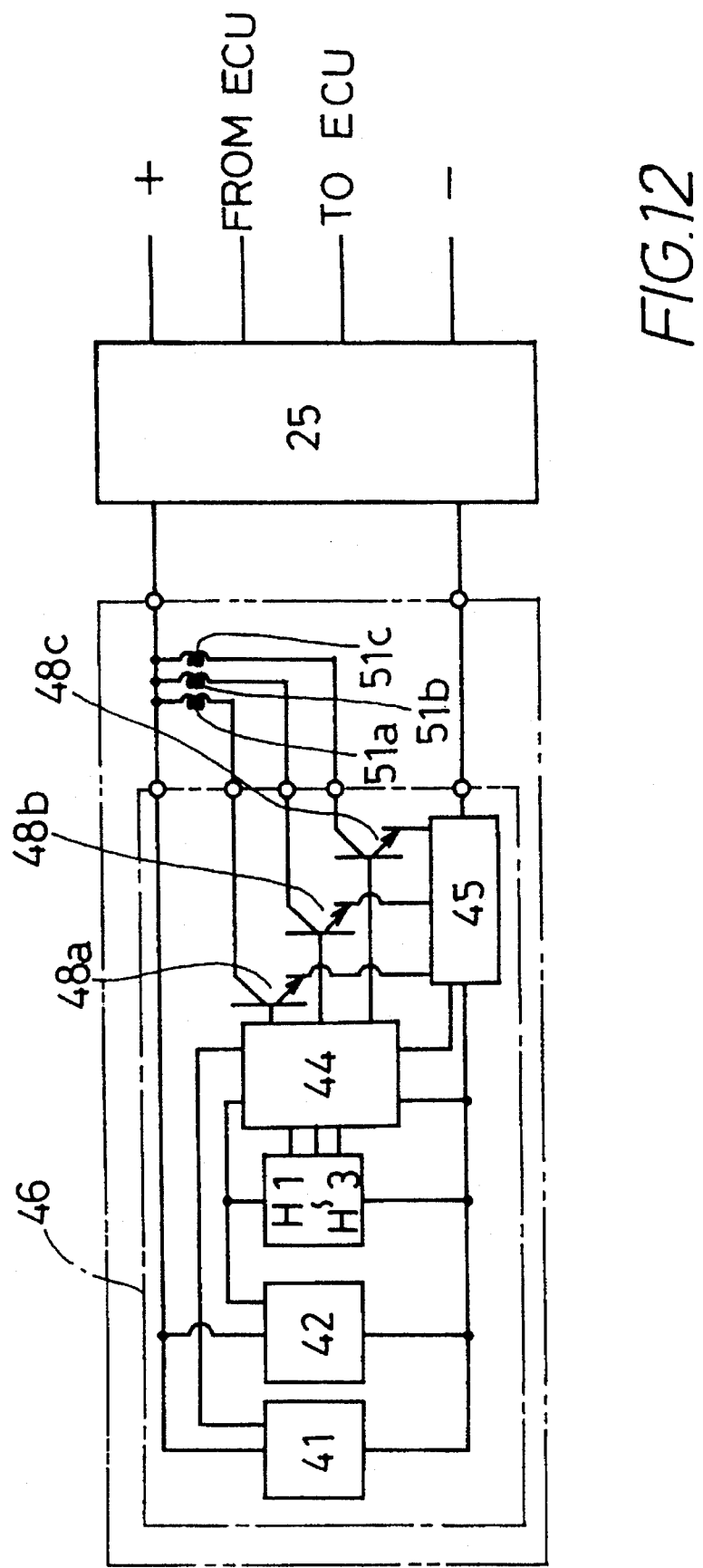
FIG. 12 is a diagram of the circuit in the air-tight case.
Figure 13:
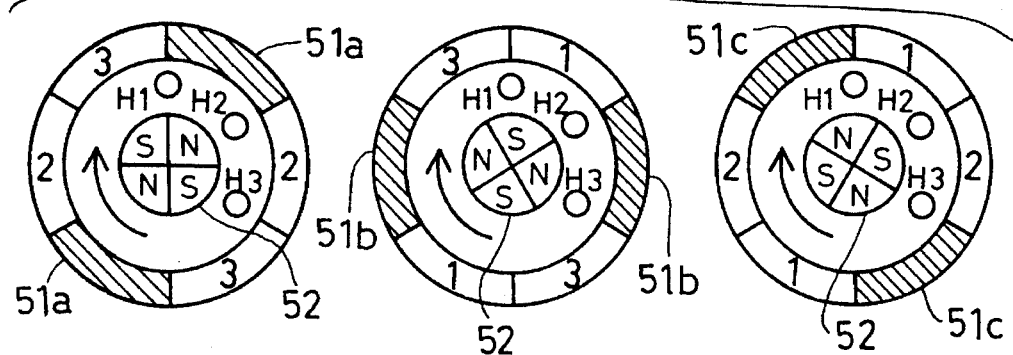
FIG. 13 illustrates the relationship between a rotor and exciting phases.

The exciting phase switching circuit 46 is shown in detail in FIG. 12. The circuit 46 includes an overvoltage protection circuit 41, a fixed voltage supply circuit 42, and hole elements H1 to H3 for detecting the angle of the rotor 52. The hole elements H1 to H3 are fixed in such a positional relationship with respect to the exciting coils 51a, 51b and 51c as shown in FIG. 13. The circuit 46 further includes power transistors 48a to 48c which are connected with the exciting coils 51a to 51c, respectively. The circuit includes a three-phase logic circuit 44, an overcurrent protection circuit 45, and the rotating speed control circuit 25 as described in the first embodiment for generating duty-ratio controlled pulses.

Figure 14:
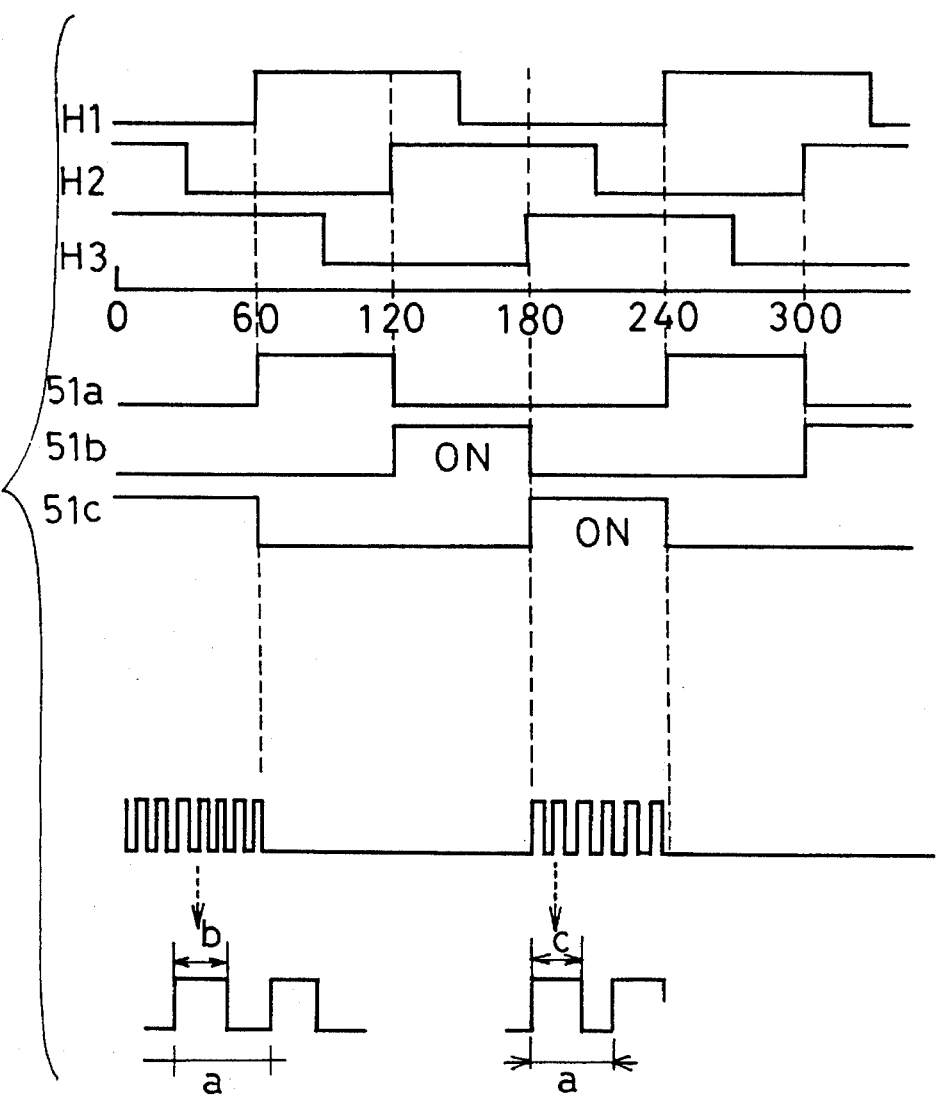
FIG. 14 illustrates the operation of the circuit of FIG. 13.

FIGS. 13 and 14 illustrate the operation of the control circuit shown in FIG. 12. As the rotor 52 rotates to turn on the hole elements H1 to H3 one by one, the exciting phase is cyclically switched from the first exciting coil 51a to the second one 51*b*, and then to the third one 51*c*, and again to the first one 51*a*. As the output from the rotating speed control circuit 25 is duty-ratio controlled, as shown in the lower row of FIG. 14, the excitation of each phase is also duty-ratio controlled. The lowermost row in FIG. 14 is an enlarged view of the supplied current, illustrating duty-ratio control at the ratio of b/a and c/a.

Figure 9:
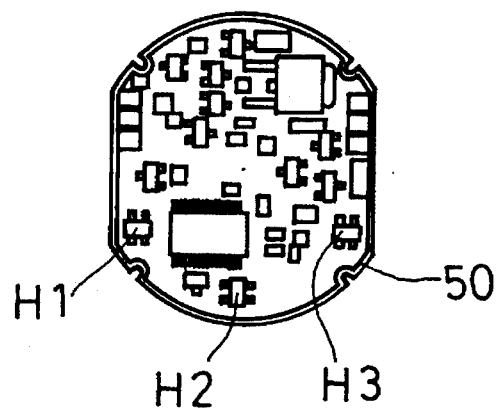
FIG. 9 is a plan view of a substrate in an air-tight case.
Figure 10:
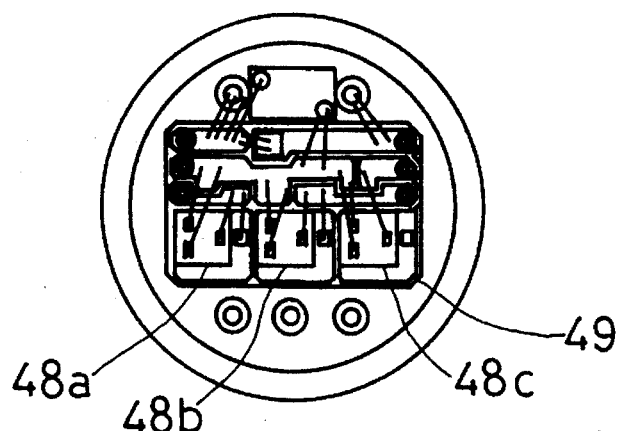
FIG. 10 is a plan view of another substrate in the air-tight case.
Figure 11:
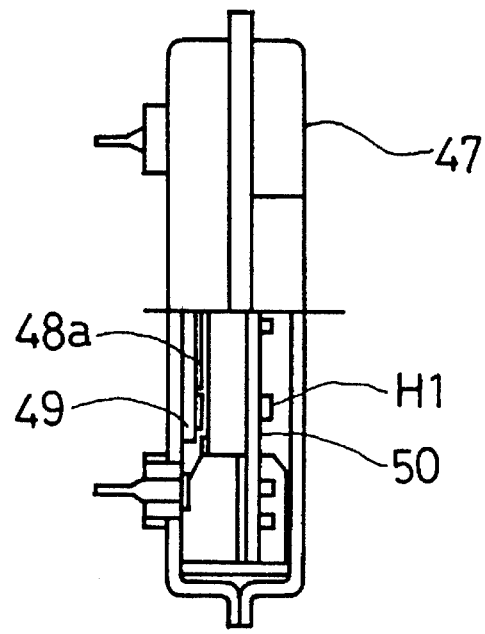
FIG. 11 is a partially sectional view of the air-tight case.

As mentioned above, the rotating speed control circuit 25 is enclosed in the case 34 and is located adjacent to the fuel pipe 38, while the exciting phase switching circuit 46 is enclosed in the air-tight container 47, as shown in FIGS. 9 to 11. The exciting phase switching circuit 46 includes two layers, i.e. one layer 50 shown in FIG. 9 and the other layer 49 shown in FIG. 10. The former layer 50 carries thereon the hole elements H1 to H3, while the latter layer 49 carries thereon the power transistors 48*a* to 48*c*. These layers 49 and 50 are enclosed in the liquid-tight container 47, as shown in FIG. 11. The liquid-tight container 47 is disposed in the housing 57 of the electrically operated pump 58, as shown in FIG. 8, being effectively cooled by fuel flowing through the housing 57.

Though the power transistors 48*a* to 48*c* for switching the exciting phase are disposed in the housing 57 in this embodiment, the power transistors 48*a* to 48*c* may be disposed in the case 34.

(Third Embodiment)

Figure 15:
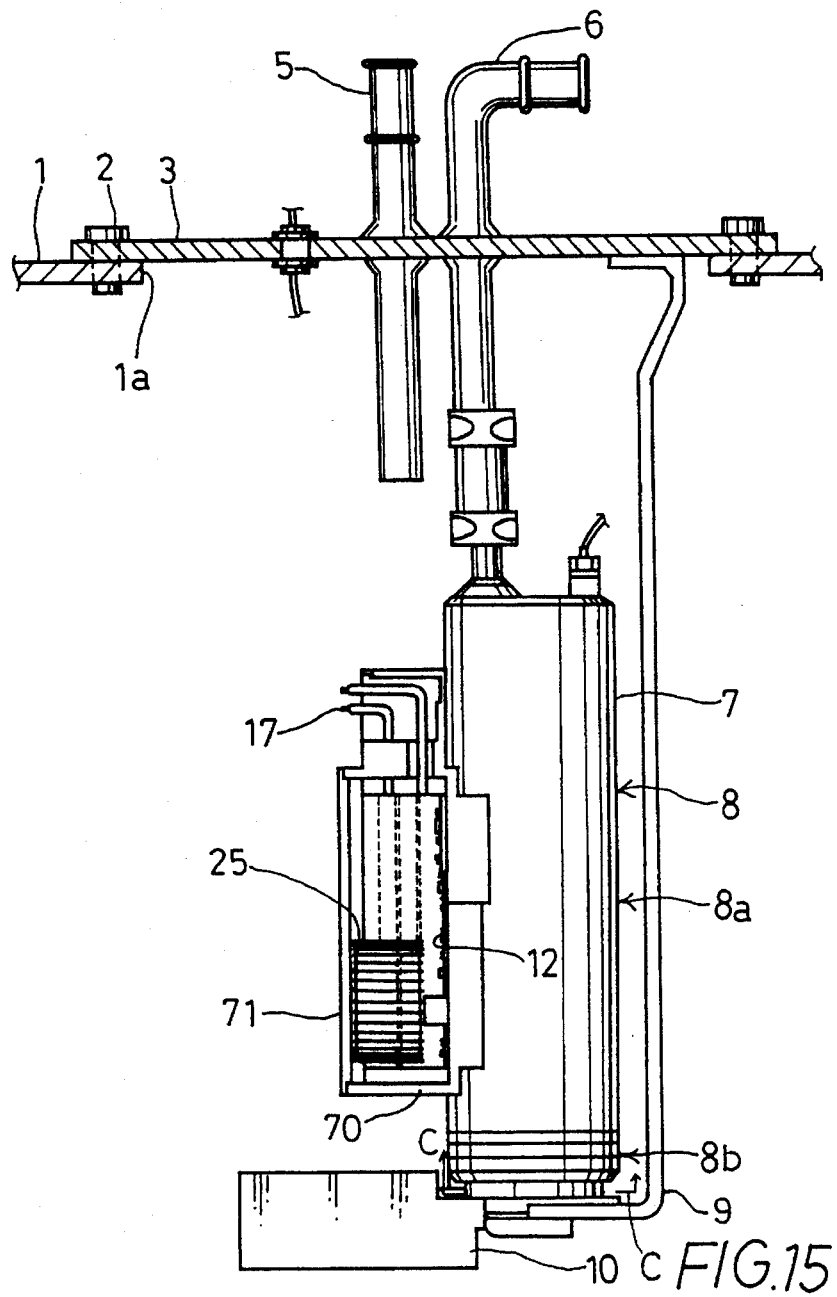
FIG. 15 is a schematic view illustrating the arrangement of the electrically operated pump, the fuel pipe and the control circuit according to a third embodiment.
Figure 16:
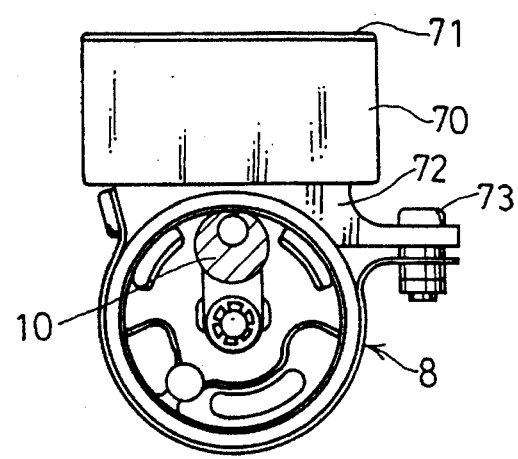
FIG. 16 is a view as seen in the direction of arrows in FIG. 15.
Figure 17:
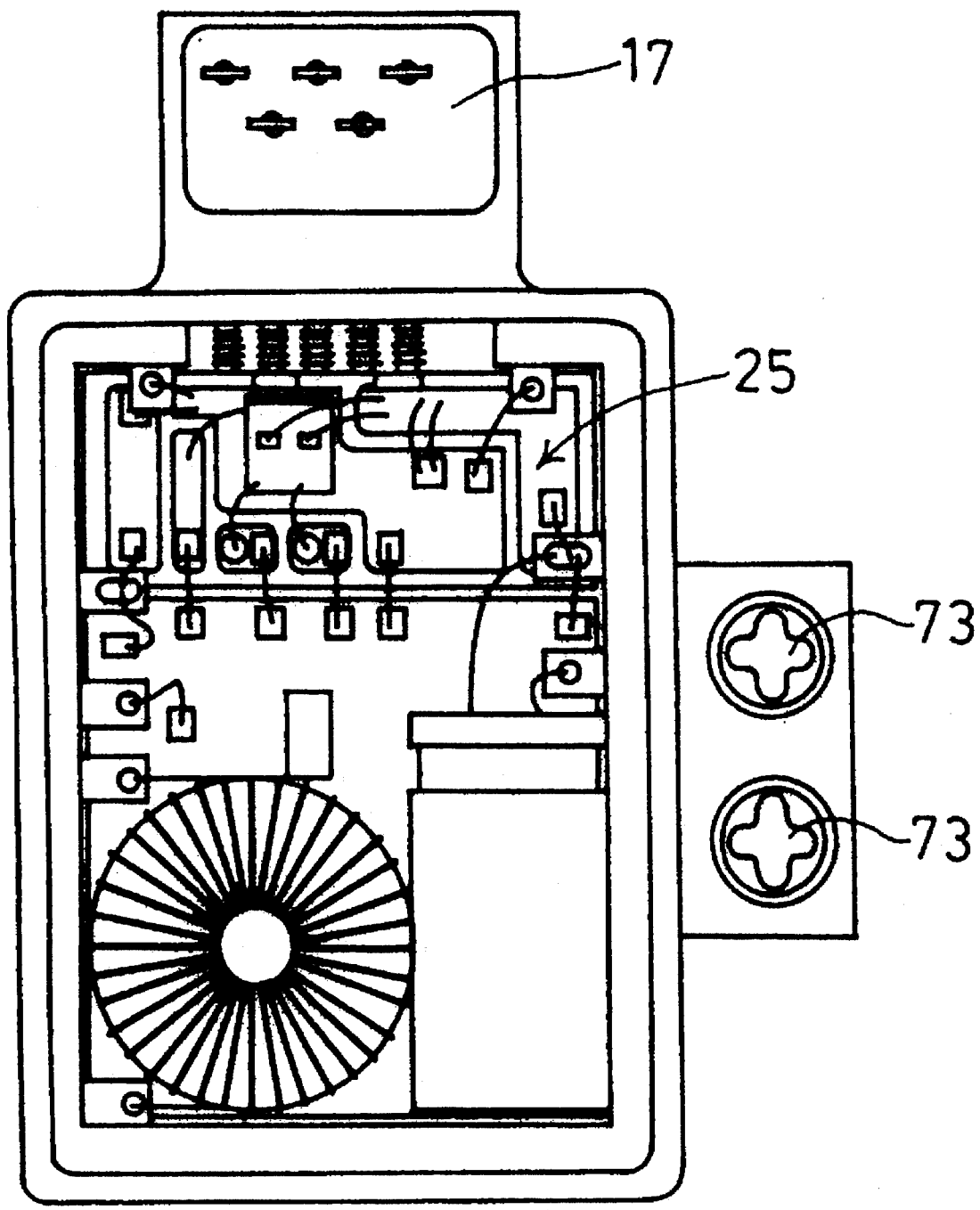
FIG. 17 is a front view of the control circuit.

In a third embodiment of the present invention shown in FIG. 15 and 16, the rotating speed control circuit 25 is attached to the outer peripheral surface of the housing 7 of the electrically operated pump 8. For this purpose, the rotating speed control circuit 25 is protected from fuel by a case 70 and a cover 71, the case 70 being fixed on the outer peripheral surface of the housing 7 by means of a flange 72 and bolts 73.

The control circuit 25 is similar to that in the first embodiment, and the power transistor 12 which will produce more heat is located adjacent to the housing 7. With this arrangement, the power transistor 12 can be also effectively cooled by fuel flowing through the housing 7.

In either of the above embodiments, the cooling efficiency may be more improved by forming the case for the control circuit 25 with radiating fins or others.

While the invention has been described with reference to preferred embodiments thereof, it is to be understood that modifications or variations may be easily made without departing from the scope of the present invention which is defined by the appended claims.

What is claimed is:

1. An electrically operated pump assembly for use in a fuel tank comprising:

a pump section;

an electric motor section for driving said pump section;

a housing in which said pump section and the electric motor section are enclosed, said housing being located in the fuel tank;

a control circuit for controlling said electric motor section; and a case for enclosing said control circuit, said case being located in the fuel tank externally of said housing and adjacent to a passage through which fuel from said pump section flows.

2. The pump assembly as defined in claim 1, wherein parts of electronic components of said control circuit which produce heat are fixedly mounted on a wall of said case which is in contact with said passage.

3. The pump assembly as defined in claim 2, wherein the passage adjacent to which said case is located comprises a fuel delivery pipe.

4. The pump assembly as defined in claim 2, wherein the passage adjacent to which said case is located comprises a portion of said housing and said case is fixed to said housing.

5. The pump assembly as defined in claim 2, wherein said case is formed in a part of a flange for installing said electrically operated pump in the fuel tank.

\* \* \* \* \*